(12) United States Patent
Wittmer et al.

(10) Patent No.: US 8,381,165 B2
(45) Date of Patent: Feb. 19, 2013

(54) METHOD FOR PRODUCING SOFTWARE MODULES FOR FIELD DEVICES OF PROCESS AUTOMATION TECHNOLOGY

(75) Inventors: Detlev Wittmer, Maulbronn (DE);
Michael Gunzert, Herxheim (DE);
Joachim Schulerer, Rheinzabern (DE)

(73) Assignee: Endress + Hauser Conducta Gesellschaft für Mess-und Regeltechnik mbH + Co. KG, Dieselstrasse, Gerlingen (DE)

( * ) Notice: Subject to any disclaimer, the term of this patent is extended or adjusted under 35 U.S.C. 154(b) by 5 days.

(21) Appl. No.: 10/534,700

(22) PCT Filed: Nov. 13, 2003

(86) PCT No.: PCT/EP03/12669
§ 371 (c)(1),
(2), (4) Date: Apr. 25, 2006

(87) PCT Pub. No.: WO2004/046837
PCT Pub. Date: Jun. 3, 2004

(65) Prior Publication Data
US 2007/0016896 A1  Jan. 18, 2007

(30) Foreign Application Priority Data
Nov. 15, 2002  (DE) .................. 102 53 603

(51) Int. Cl.
*G06F 9/44* (2006.01)
(52) U.S. Cl. ...................................... 717/100
(58) Field of Classification Search ............. 717/100
See application file for complete search history.

(56) References Cited

U.S. PATENT DOCUMENTS

| | | | |
|---|---|---|---|
| 5,682,476 A | 10/1997 | Tapperson et al. | |
| 5,793,963 A | 8/1998 | Tapperson et al. | |
| 5,907,292 A | 5/1999 | Ahr | |
| 5,960,214 A * | 9/1999 | Sharpe et al. | 710/15 |
| 6,236,334 B1 | 5/2001 | Tapperson et al. | |
| 6,278,960 B1 * | 8/2001 | De Groot | 717/148 |
| 6,304,877 B1 * | 10/2001 | LeBlanc | 707/999.1 |
| 6,754,703 B1 * | 6/2004 | Spring | 709/223 |
| 2002/0065631 A1 | 5/2002 | Loechner | |
| 2003/0043052 A1 | 3/2003 | Tapperson et al. | |
| 2005/0071522 A1 * | 3/2005 | DeGroot | 710/15 |
| 2006/0150081 A1 * | 7/2006 | Seger et al. | 715/513 |
| 2007/0088518 A1 * | 4/2007 | Braun | 702/108 |

OTHER PUBLICATIONS

"PROFIBUS Technology and Application—System Description" Oct. 2002.*
"Field Device Integration" by Simon et al. IEEE 2001.*
Poschmann et al., "Experience with formal methods implementing the PROFIBUS FMS and DP protocol for industrial applications", 1997, IEEE pp. 277-286.*

(Continued)

*Primary Examiner* — Wei Zhen
*Assistant Examiner* — Junchun Wu
(74) *Attorney, Agent, or Firm* — Bacon & Thomas, PLLC

(57) ABSTRACT

In a method for producing software modules for field devices for process automation technology (PROFIBUS), wherein the software modules serve as device descriptions and have defined interfaces, in accordance with the FDT/DTM, for application programs in process control systems, syntactically and semantically correct, standard device descriptions are produced in EDD 1.1 from PDM, HCF or company-specific device descriptions for field devices, and the EDD 1.1 versions are then converted into corresponding software modules by means of a compiler C.

6 Claims, 1 Drawing Sheet

OTHER PUBLICATIONS

Pöschmann et al, "Experience with formal methods implementing the PROFIBUS FMS and DP protocol for industrial applications", 1997 IEEE, pp. 277-286.*
Diedrich et al., "Field Device Integration in DCS Engineering using a Device Model", 1998, IEEE, pp. 164-168.*
P6schmann et al, "Experience with formal methods implementing the PROFIBUS FMS and DP protocol for industrial applications", 1997 IEEE, pp. 277-286.*
"Simatic PDM", Jan. 2001.*
"PROFIBUS technology and application—system description", Oct. 2002.*
Poschmann et al, "Experience with formal methods implementing the PROFIBUS FMS and DP protocol for industrial applications", 1997 IEEE, pp. 277-286.*
"Simatic PDM", Siemens, Jan. 2001.*
Simon et al., "Field device Integration", 2001, IEEE.*
Diedrich et al. "Field Device Integration in DCS Engineering using a Device Model", 1998, IEEE.*
Zulkifli et al. "Generic Device Description for Complex HART Field Devices", 2002, IEEE.*
Dipl.-Ing. Rene Simon, "Field Device Integration", 2001 IEEE.

* cited by examiner

METHOD FOR PRODUCING SOFTWARE MODULES FOR FIELD DEVICES OF PROCESS AUTOMATION TECHNOLOGY

FIELD OF THE INVENTION

The invention relates to a method for producing software modules for field devices of process automation technology.

BACKGROUND OF THE INVENTION

In process automation technology, field devices are frequently used, which serve for registering and/or influencing process variables. Examples of such field devices are fill level measuring devices, mass flow meters, pressure meters, meters for measuring temperature, etc., which register the corresponding process variables fill level, mass flow rate, pressure, and temperature. Serving for the influencing of process variables are so-called actuators, which, e.g. as valves, influence the flow of a liquid in a section of pipeline.

The field devices are usually connected to a data bus, and are, as a rule, connected with a central control-, or engineering-, system, which controls the entire process flow and/or enables a direct access to the individual field devices. In the control system, the measured values of the different process variables are evaluated and/or monitored, and appropriate actuators are correspondingly activated for influencing the process. Data transmission between field device and control occurs according to the known international standards for field busses, such as e.g. Hart, Foundation Fieldbus, Profibus, CAM, etc.

Today's automated plants frequently involve a large number of different field devices of a widest variety of manufacturers. Before startup and/or during operation, adjustments must occur at the field devices. These adjustments must frequently be made on site. To this end, the individual field device manufacturers provide different configuration programs for the different devices. Becoming competent with the different programs, including the different operating philosophies, demands extreme effort and time on the part of the user.

The parametering of individual field devices or the configuring of certain groups of field devices in an automated plant having a multiplicity of field devices is extremely complex and expensive, because of the various communications interfaces and the required protocols. The configuring, operating, and maintaining of a field device in an automated plant should be considerably simpler to perform. Desired is the integration of field devices into control systems or engineering applications via a Plug and Play capability, such as is already known e.g. for printers in Windows environments.

Various field device manufacturers have, therefore, come together in PNO (POFIBUS Nutzerorganisation e.V.), for the purpose of enabling a simpler handling of field devices. The field device manufacturers develop special software modules for their field devices. These software modules are delivered with the field devices to the customers. Each software module encapsulates all data and functions of the particular field device and represents, in principle, a black box. Additionally, the device manufacturer can integrate into these software modules its own "look and feel". I.e., the user interface always looks the same to the user, independently of the particular application. The application program, which serves e.g. for configuring, visualizing, operating and maintaining the different field devices, accesses the particular software modules of the field device via a defined interface. One possibility is the FDT/DTM interface specification, as given in the Profibus Guideline-Order No. 2.162, volume 3, of November 2000, which can be obtained via the PNO, Karlsruhe, Germany (www.profibus.com). The content of such guideline is incorporated here by reference.

At the moment, corresponding software modules are available only for a few field devices. For a large number of field devices, the software modules still have to be produced by the pertinent manufacturers. One possibility is to convert available device descriptions by means of compilers, or generators, into corresponding software modules.

The available device descriptions, however, do not exist in a uniform form, or language. There are PDM device descriptions, HCF device descriptions, as well as company-specific device descriptions stored in internal company databases. For each of these categories of different device descriptions, a separate compiler is necessary.

Disadvantageous in the case of such method is that one must generate different compilers for different categories of device descriptions. A further disadvantage of such method is that, in the case of changes, all utilized compilers always have to be revised, in order to prevent inconsistencies. This makes the generating of software modules for field devices by means of present device descriptions very complex.

SUMMARY OF THE INVENTION

It is an object of the invention to provide a method for producing software modules for field devices of process automation technology, wherein the desired software modules are produced in simple and cost-favorable manner from existing device descriptions.

An essential idea of the invention is not to apply different compilers for different groups of existing device descriptions, but, instead, to produce, from standard device descriptions for field devices, syntactically and semantically correct, standard device descriptions and then to convert these by means of a compiler into the corresponding software modules.

BRIEF DESCRIPTION OF THE DRAWINGS

The invention will now be explained in greater detail on the basis of an example illustrated in the drawing, the figures of which show as follows.

DESCRIPTION OF THE PREFERRED EMBODIMENT

Figure 1:
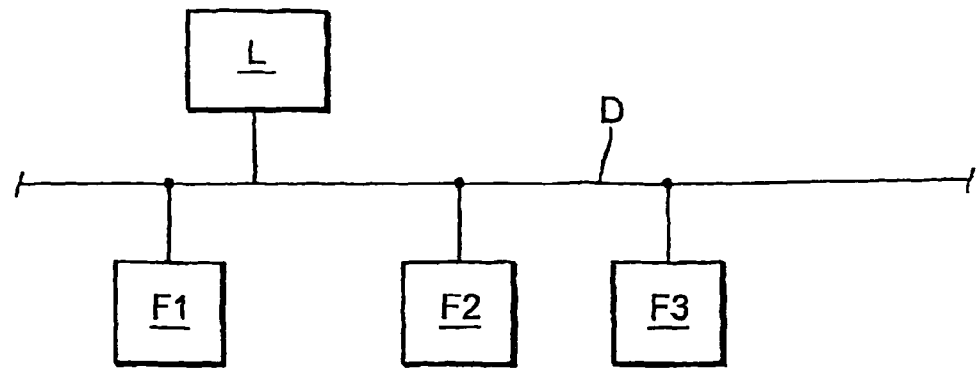
FIG. 1 schematic diagram of an installation for automation.

FIG. 1 is a schematic diagram of an installation for automation. A control system L is connected via a data bus D with a plurality of field devices F1, F2, F3, etc. The field devices F1-F3 can be e.g. pressure meters, temperature meters, or flow meters. The control system L communicates via the data bus D with the relevant field device, e.g. F1. In this way, measured values or parameters of the field device can be transmitted to the control system L. At the same time, the parametering of the field device F1 can occur from the control system L.

Data communication on the data bus D occurs according to corresponding international standards, such as e.g. HART, Profibus, FF or CAN.

Figure 2:
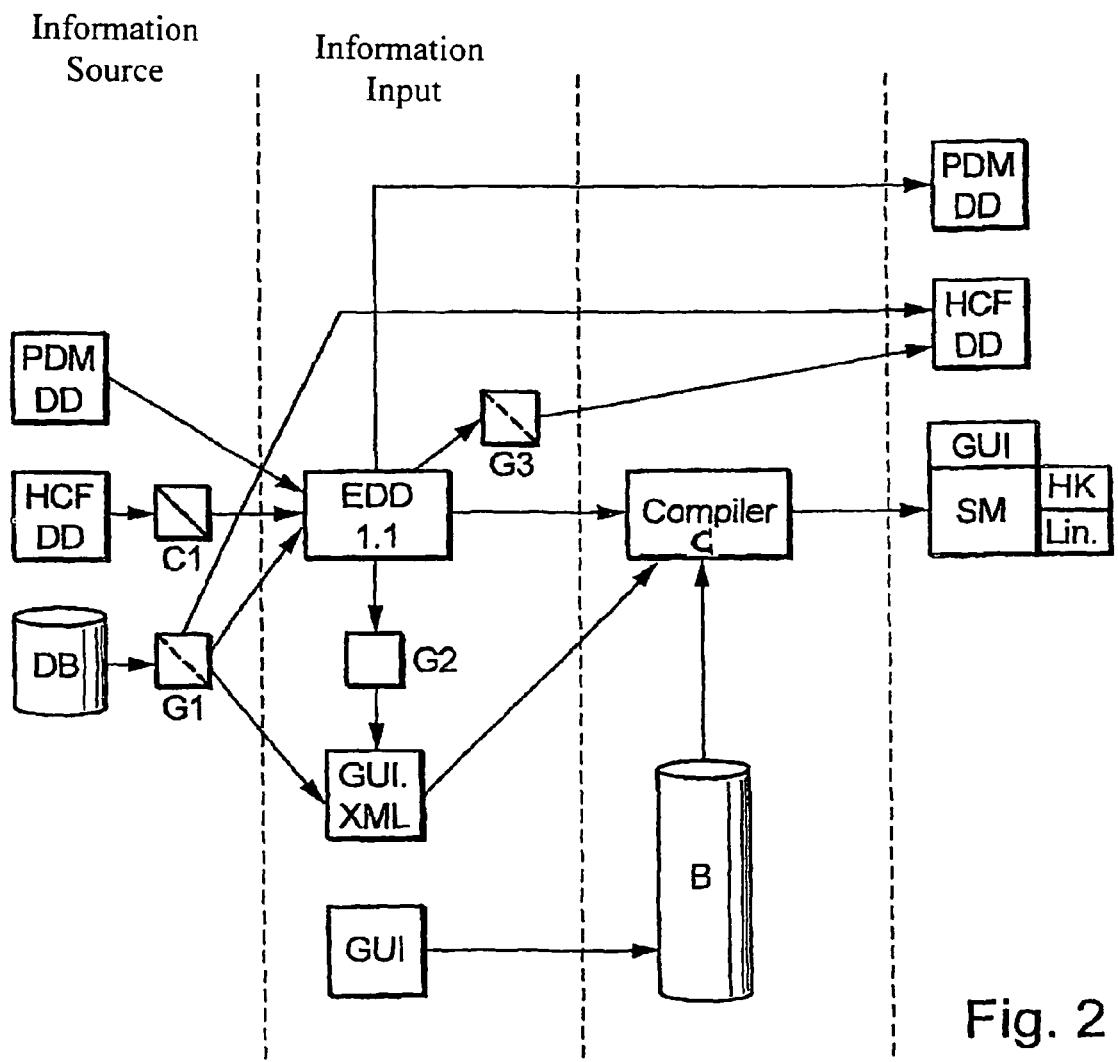
FIG. 2 schematic illustration of essential elements of the method of the invention.

For currently marketed field devices, there exist many groups of device descriptions in different forms and languages. Examples are, as given in FIG. 2, PDM device descriptions, HCF device descriptions and a database DB containing company-internal device descriptions. At least the PDM device descriptions, as well as the HCF device descriptions, contain ambiguities.

In a first method step, syntactically and semantically correct, standard device descriptions are created from standard device descriptions (PDM device descriptions, HCF device descriptions, firm-specific device descriptions). Used for this purpose is the generator G1, or the compiler C1, as the case may be. Serving as an example of a semantically and syntactically correct, standard device description is EDD 1.1.

Then, the semantically and syntactically correct, standard device description is converted with the help of a compiler C into a software module SM (e.g. DTM), which has defined interfaces to application programs in the process control system. By producing the software module SM by way of the intermediate step through an EDD, the essential advantages of the method of the invention are obtained. Only a single compiler C is needed to produce the software module SM.

Furthermore, from the standard device descriptions (EDD 1.1) (PROFIBUS Guideline -Order No. 2.162 "Specification for profibus Device Description and device Integration", Volume 2) then available in syntactically and semantically correct form., PDM device descriptions can likewise be easily produced.

Beyond this, from device descriptions in EDD 1.1, a generator G2 can be used to produce graphical user interfaces in XML language GUI.XML for the corresponding, field-device-specific components (configuration, help-functions, etc.). For this, also the generator G1 can be used, for processing information from the database DB. The components produced in this way can then likewise be processed in the compiler C.

A further opportunity is to produce general graphical user interfaces GUIs and to store these in a library B (DTM-Studio component library). These components can likewise be linked in the compiler C, so that the software module SM also has proprietary interfaces for GUIs, or for components EC, or Lin., as the case may be. In this way, an envelope curve presentation capability (component EC), or a linearizing capability (component Lin.), as the case may be, can be integrated in simple manner into corresponding software modules SM.

The invention claimed is:

1. A method for producing software modules for field devices for process automation technology, that encapsulate all the data and functions of the corresponding field devices, wherein the software modules serve as device descriptions and have defined interfaces for application programs in process control systems, comprising the steps of:
    generating syntactically correct standard device descriptions from PDM (Process Device Manager) device descriptions, HCF (HART COMMUNICATION FOUNDATION) device descriptions or company specific electronic device descriptions for field devices not having a uniform form, or language by means of a first compiler or generator; and
    converting the syntactically and semantically correct standard device descriptions further into corresponding software modules by means of a second compiler.

2. The method as claimed in claim 1, wherein:
    interfaces and the software modules meet the FDT/DTM (Field Device Tool/Device Type Manager) specifications.

3. The method as claimed in claim 1, wherein:
    the electrical device descriptions are one of: PDM (Process Device Manager) device descriptions, HCF (HART COMMUNICATION FOUNDATION) device descriptions or company-specific device descriptions.

4. The method as claimed in claim 1, wherein:
    the syntactically and semantically correct standard device descriptions are EDD (Electronic Data Device) 1.1 device descriptions.

5. The method as claimed in claim 4, further comprising the step of:
    producing the EDD (Electronic Data Device) 1.1 device descriptions from PDM (Process Device Manager) device descriptions.

6. The method as claimed in claim 4, further comprising the step of:
    using the second compiler to produce graphical user interfaces in XML (Extensible Markup Language) language from the EDD (Electronic Data Device) 1.1 device descriptions.

* * * * *